United States Patent Office 3,418,293
Patented Dec. 24, 1968

3,418,293
**PROCESS FOR THE PREPARATION OF POLY-
VINYL ALCOHOL BY POLYMERISING A
VINYLOXYSILANE AND ALCOHOLYSING
THE POLYMER OBTAINED**
Wilfred Bolchert, Lyon, France, assignor to Rhone-
Poulenc S.A., Paris, France, a French body
corporate
No Drawing. Filed Oct. 11, 1965, Ser. No. 494,905
Claims priority, application France, Oct. 13, 1964,
991,243
2 Claims. (Cl. 260—80)

ABSTRACT OF THE DISCLOSURE

Polyvinyl alcohol is prepared by polymerising a vinyloxytrialkylsilane with an ionic catalyst at low temperature and alcoholysing the polymer obtained with an alkanol of 1 to 4 carbon atoms.

---

This invention relates to the preparation of polyvinyl alcohol, and to intermediates useful therein.

The usual process for the preparation of polyvinyl alcohol consists in polymerising vinyl acetate and then hydrolysing or alcoholysing the polymer obtained.

It has also been proposed to polymerise vinyl ethers, more particularly vinyl t-butyl ether and vinyl benzyl ether, and then to treat the polymers obtained with hydrobromic acid to liberate the polyvinyl alcohol (S. Murahashi et al., J. Polymer Sci., 62, No. 174S77 (1962). However, the production of vinyl ethers in general, and the aforesaid ethers in particular, is laborious and the yields are poor. Moreover, the conversion of polyvinyl ether to alcohol only takes places using a strong acid such as hydrobromic acid.

A new process for the preparation of polyvinyl alcohol has now been discovered, based on the intermediate formation of a vinyl ether polymer but not involving the use of hydrobromic acid to liberate the polyvinyl alcohol.

The new process comprises polymerising, at low temperature in an inert, anhydrous organic solvent and in the presencee of an ionic catalyst, a vinyloxysilane of the formula:

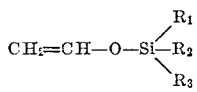

in which $R_1$, $R_2$ and $R_3$ are the same or different and each represents a hydrocarbon radical, and then alcoholysing the poly(vinyloxytriorganosiloxane) produced with water or an alkanol respectively. The symbols $R_1$, $R_2$, $R_3$ represent more particularly alkyl, cycloalkyl, aryl, aralkyl and alkylaryl radicals, and more particularly still alkyl of 1 to 4 carbon atoms, e.g. methyl or ethyl, phenyl, phenyl substituted by methyl or ethyl, benzyl, or cyclohexyl. Specific compounds suitable for this reaction include, more particularly, vinyloxytrimethylsilane, vinyloxytriethylsilane. vinyloxydimethylphenylsilane and vinyloxydimethylbenzylsilane.

The polymerisation is carried out at low temperature, ordinarily between −80° C. and 0° C., in an anhydrous organic diluent which is inert under the operating conditions, and in the presence of an ionic catalyst. As the ionic catalyst, the so-called Friedel-Crafts catalysts and the catalysts employed in the polymerisation of olefines and known as Ziegler catalyst may be employed. More specifically boron trifluoride and its addition complexes with compounds having a free electron pair such as ethers may be employed. There may also be mentioned $TiCl_4$, and pairs such as $TiCl_4/Al(C_2H_5)_3$, $Al(C_2H_5)Cl_2$, $AlCl_3$, and $SnCl_4$.

The proportion of catalyst may vary within fairly wide limits, depending upon the specific monomer employed, the precise catalyst and the reaction temperature. Generally speaking, however, the proportion of catalyst is between 0.5% and 5% by weight of the monomer.

The diluent may be any organic compound which is liquid and inert under the operating conditions, more particularly alkanes such as, for example, hexane, or aromatic compounds, more particularly benzene derivatives, such as for example, toluene.

The polymerisation product is a solution of poly(vinyloxytriorganosilane) which may be used to prepare polyvinyl alcohol as it is or after elimination of the diluent. This conversion into polyvinyl alcohol may be effected by alcoholysis.

Alcoholysis does not involve the use of any special operating conditions, and may be carried out with any lower alkanol, and more particularly with methanol, ethanol or propanol, and at normal temperature (i.e. about 20° C.). In this alcoholysis, a silanic ether of the formula:

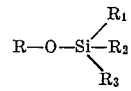

is simultaneously produced in which R represents the radical corresponding to the alkanol R—OH employed and the other symbols are as previously defined. This ether may be reused in the manner indicated hereinafter.

The vinyloxytriorganosilanes employed as starting material may be prepared by any known method. However, it is advantageous to prepare them by the described method. However, it is advantageous to prepare them by the described method in application No. 495,324, filed Oct. 12, 1965 of common assignee herewith, by reacting acetaldehyde with a triorganochlorosilane in the presence of zinc chloride and a tertiary amine. The reaction on which this process is based may be diagrammatically represented as follows:

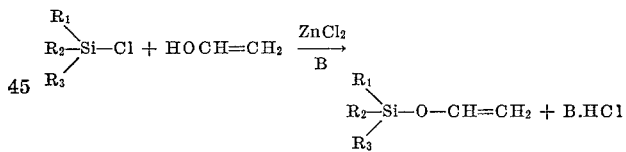

where B represents a tertiary amine, for example triethylamine or a dialkylaniline, and $R_1$, $R_2$ and $R_3$ are as hereinbefore defined.

The starting materials used in this invention may therefore be readily obtained by the action of compounds such as trimethylchlorosilane, triethylchlorosilane, dimethylphenylchlorosilane or dimethylbenzylchlorosilane on acetaldehyde in the presence of $ZnCl_2$ and a tertiary amine. If desired, this reaction may be carried out in an organic diluent which is inert under the operating conditions, for example an alkane such as hexane or a benzene hydrocarbon. The reaction may be carried out at ambient temperature (about 20° C.) or at lower temperature, for example at about 0° C. The operation may also optionally be carried out at a temperature somewhat above 20° C. At the end of the reaction, the amine hydrochloride is separated and the desired vinyl ether is obtained.

The silanic ether produced as a by-product in the alcoholysis may readily be converted into a triorganochlorosilane by the action of any suitable chlorinating agent. For this purpose, compounds such as phosphorus pentachloride or a carboxylic acid chloride, such as acetyl chloride, may be employed. The triorganochlorosilane thus regenerated may be reused to prepare the starting material of the new process.

The reduced specific viscosities of the polyvinyl alcohols obtained by the process of the invention, determined at 25° C. on solutions in normal hydrochloric acid at a concentration of 5 g./l., may be up to 70 cc./g. With commercial polyvinyl alcohols obtained from polyvinyl acetate, the reduced specific viscosities generally vary from 30 to 120 cc./g.

According to Fujii et al. (J. Polymer Sci. A2, 2327 (1964)), it is possible to assess the degree of isotacticity of a polyvinyl alcohol by infra-red spectrography, evaluating the ratio of the relative optical densities at the bands at 916 cm.$^{-1}$ and 850 cm.$^{-1}$. This ratio $D_{916}D_{850}$ is equal to zero for a completely isotactic polyvinyl alcohol, but is about 0.4:1 for commercial atactic polyvinyl alcohol obtained from polyvinyl acetate. By the process of the invention, isotactic polyvinyl alcohols whose ratio $D_{916}/D_{850}$ is as low as 0.04 can be obtained.

With any particular catalyst, the degree of isotacticity of the polyvinyl alcohol obtained varies with the polarity of the solvent. Non-polar solvents such as toluene and hexane favour the formation of isotactic polymer.

Depending upon the catalyst employed for the polymerisation, the polyvinyl alcohols obtained may or may not be water-soluble. Some polyvinyl alcohols are water-soluble at ambient temperature, i.e. at temperatures of about 20° C., e.g. the products obtained by polymerisation in the presence of stannic chloride; others are water-soluble only at the boiling point, e.g. the products obtained in the presence of catalysts based on aluminium; and others are completely water-insoluble, even at the boiling point, e.g. the products prepared in the presence of TiCl$_4$. All the polyvinyl alcohols obtained by the process of the invention are soluble in aqueous solutions of strong mineral acids. The possibility of thus preparing water-insoluble polymers is a considerable advantage in the case of pre-shaped objects, since fibres, filaments and films obtained from non-stereoregular polyvinyl alcohol must usually undergo thermal and chemical treatments to reduce or eliminate their sensitivity to water.

The poly(vinyloxytriorganosiloxanes) produced in the first stage of the process of this invention are new compounds and, as such, within the scope of the invention.

The following examples illustrate the invention.

EXAMPLE 1

Into a 125 cc. glass reactor immersed in a bath adjusted to a temperature of —78° C., provided with a stirrer and a dropping funnel and previously purged with nitrogen, are introduced 15 cc. of toluene and 133 mg. (0.001 mole) of aluminium chloride. A solution of 11.6 g. (0.1 mole) of vinyloxytrimethylsilane in 15 cc. of toluene is then slowly added with stirring. 5 hours later, 15 cc. of methanol are introduced and the mixture is allowed to return to ambient temperature. Gas chromatography shows that the solution obtained contains 8.8 g. of methoxytrimethylsilane, a yield of 84%. 20 cc. of diethyl ether are added to the reaction mixture to facilitate separation of the polymer, which is then filtered off. The polymer is first washed with a mixture of ether and methanol and then with pure methanol. After drying, 3.76 g. of polyvinyl alcohol are obtained, identified by its infra-red spectrum, a yield of 85%.

EXAMPLE 2

The procedure described in Example 1 is followed, but the aluminium chloride is replaced by 190 mg. of TiCl$_4$. On treatment with methanol as in Example 1, 3.67 g. of polyvinyl alcohol are obtained, a yield of 83%.

EXAMPLE 3

Into a reactor equipped in the same way as that of Example 1 15 cc. of toluene, 0.182 g. of TiCl$_4$ and 0.143 g. of aluminium triethyl are charged. The reactor is heated for 10 minutes at 60° C., and then plunged into a bath at —78° C. Vinyloxytrimethylsilane is then added and the mixture allowed to react as in Example 1. After evaporation of the solvent, 7.8 g. (a yield of 67%) of polyvinyloxytrimethylsilane (identified by its infra-red spectrum) are obtained which, by alcoholysis with methanol, is converted into polyvinyl alcohol, identified by infra-red spectrography.

EXAMPLE 4

Into the reactor of Example 1, purged with nitrogen and maintained at —78° C., 20 cc. of toluene and 8.36 g. of vinyloxytriethylsilane are introduced. With the aid of a syringe, 0.080 g. of TiCl$_4$ is introduced initially and then after 30 minutes and 60 minutes. After reaction for 5 hours, the mixture is worked up as in Example 1, and 1.83 g. of polyvinyl alcohol is obtained identified by its infra-red spectrum, a yield of 79%.

EXAMPLE 5

(a) Into a cylindrical, 500 cc. borosilicate glass receptacle equipped with a stirrer and carefully purged with nitrogen, 50 cc. of toluene and 11.6 g. (0.1 mole) of vinyloxytrimethylsilane are introduced. The mixture is cooled with a cooling bath maintained at —78° C., 0.14 g. of aluminium chloride is added and the whole is stirred for 6 hours. 150 cc. of toluene and 100 cc. of methanol are then successively added, and the mixture is allowed to return to ambient temperature.

The polymer obtained is filtered off and purified by dissolving it in water and reprecipitating it with acetone. After further filtration, washing with methanol and drying, 3.84 g. of polyvinyl alcohol are collected, soluble in boiling water and having a reduced specific viscosity of 63 cc./g. Study of a specimen by infra-red spectrography shows that the ratio $D_{916}/D_{850}$ is 0.10:1.

(b) When the toluene is replaced by the same quantity of hexane and the polymer is purified by washing with methanol only, 4.35 g. of polyvinyl alcohol are obtained having a reduced specific viscosity of 67 cc./g., and a $D_{916}/D_{850}$ ratio of 0.09:1.

EXAMPLE 6

(a) The procedure of Example 5a is followed, but the aluminium chloride is replaced by 0.2 g. of ethyl aluminium-dichloride and the polymer is purified by washing with methanol only. 4.12 g. of polyvinyl alcohol are obtained soluble in boiling water. It possesses a reduced specific viscosity of 59 cc./g. and a $D_{816}/D_{850}$ ratio of 0.04:1.

(b) By replacing the toluene by methylene chloride, 3.08 g. of polyvinyl alcohol are obtained, soluble in hot water, having a reduced specific viscosity of 22 cc./g., and a $D_{916}/D_{850}$ ratio of 0.39:1.

EXAMPLE 7

The procedure of Example 6a is followed, the ethyl aluminium dichloride being replaced by 0.22 cc. of titanium tetrachloride. 4.28 g. of polyvinyl alcohol are obtained, soluble at ambient temperature in normal aqueous hydrochloric acid, and having a reduced specific viscosity of 32 cc./g.

EXAMPLE 8

Into the vessel described in Example 5 50 cc. of toluene, 0.15 cc. of triethyl-aluminium and 0.11 cc. of titanium tetrachloride are introduced. The whole is stirred for 15 minutes and then cooled to —78° C. 11.6 g. of vinyloxytrimethylsilane are added and, after 6 hours, the mixture is diluted with 100 cc. of methanol and allowed to return to ambient temperature. The polymer is filtered off and then purified by dissolution in normal hydrochloric acid followed by reprecipitation by addition of acetone. After filtration, washing with methanol and drying 3.54 g. of polyvinyl alcohol are obtained, having a reduced viscosity of 35 cc./g.

EXAMPLE 9

The procedure of Example 5a is followed, the aluminium chloride being replaced by 0.12 cc. of tin tetrachloride, and 3.84 g. of polyvinyl alcohol, are obtained, soluble in water at ambient temperature, and having a specific viscosity of 20 cc./g. and a $D_{916}/D_{850}$ ratio of 0.21:1.

I claim:
1. Process for the preparation of polyvinyl alcohol which comprises polymerising at 0° to −80° C. in an anhydrous aliphatic or aromatic solvent and in the presence of a catalyst selected from anhydrous aluminium chloride, titanium tetrachloride, titanium tetrachloride/aluminium triethyl, ethylaluminiumdichloride, and tin tetrachloride, a vinyloxysilane of the formula:

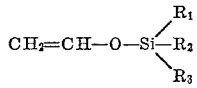

in which $R_1$, $R_2$ and $R_3$ are each alkyl of 1 to 4 carbon atoms, and then alcoholysing the poly(vinyloxytrialkylsilane) produced with an alkanol of 1 to 4 carbon atoms.

2. Process according to claim 1 in which $R_1$, $R_2$ and $R_3$ are all methyl.

References Cited

UNITED STATES PATENTS 2,441,066 5/1948 Hanford _____ 260—46.5
3,101,991 8/1963 Fukushima et al. _____ 18—54

FOREIGN PATENTS 138,619 11/1960 U.S.S.R.

OTHER REFERENCES

Organosilicon Compounds, Eaborn, C., p. 295, Academic Press Inc., N.Y., 1960.
Chemical Abstracts, 58, 544a, 1964.

JOSEPH L. SCHOFER, *Primary Examiner.*
C. A. HENDERSON, *Assistant Examiner.*

U.S. Cl. X.R.
260—91.3